United States Patent
Herrero

(10) Patent No.: US 9,660,915 B2
(45) Date of Patent: May 23, 2017

(54) CONGESTION CONTROL FOR TUNNELED REAL-TIME COMMUNICATIONS

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

( * ) Notice: Subject to any disclaimer, the term of this patent is extended or adjusted under 35 U.S.C. 154(b) by 64 days.

(21) Appl. No.: 14/708,732

(22) Filed: May 11, 2015

(65) Prior Publication Data

US 2016/0337241 A1 Nov. 17, 2016

(51) Int. Cl.
*H04L 12/801* (2013.01)
*H04L 12/853* (2013.01)

(52) U.S. Cl.
CPC .......... *H04L 47/12* (2013.01); *H04L 47/2416* (2013.01)

(58) Field of Classification Search
CPC ...................................................... H04L 47/12
USPC ........................................................ 370/237
See application file for complete search history.

(56) References Cited

U.S. PATENT DOCUMENTS

| | | | | |
|---|---|---|---|---|
| 9,332,049 | B1 * | 5/2016 | Herrero | H04L 65/602 |
| 2002/0065921 | A1 * | 5/2002 | Davidson | H04L 29/06 709/227 |
| 2005/0220069 | A1 * | 10/2005 | Li | H04L 45/306 370/349 |
| 2011/0016209 | A1 * | 1/2011 | Moncaster | H04L 43/0852 709/224 |
| 2012/0051216 | A1 * | 3/2012 | Zhang | H04L 47/12 370/230 |
| 2013/0088997 | A1 * | 4/2013 | Briscoe | H04L 47/10 370/252 |
| 2015/0195202 | A1 * | 7/2015 | Ogura | H04M 3/00 370/236 |

OTHER PUBLICATIONS

H. Schulzrinne et al.; "RTP: A Transport Protocol for Real-Time Applications";Jul. 2003; 89 pages.
3rd Generation Partnership Project; Technical Specification Group Services and System Aspects; Study on firewall traversal (Stage 2) (Release 12); 3GPP TR 33.830 V0. 5.0 (Nov. 2013).
M. Mathis et al.; "The macroscopic behavior of the TCP congestion avoidance algorithm"; Computer Communication Review; Association for Computing Machinery ("ACM") Special Interest Group on Data Communication ("SIGCOMM"); v.27 No. 3, pp. 67-87; Jul. 1997.

* cited by examiner

*Primary Examiner* — Melvin Marcelo
*Assistant Examiner* — Peter G Solinsky
(74) *Attorney, Agent, or Firm* — Miles & Stockbridge P.C.

(57) ABSTRACT

A system performs congestion control functionality for real-time communications ("RTC"). The system establishes a tunnel by a tunneling server with a tunneling client of a user equipment ("UE"). The system receives a request from the UE to enable the congestion control functionality for an inner socket of the tunnel. The system sends a response back to the UE to indicate that the congestion control functionality is enabled for the inner socket. The system then monitors congestion conditions at an outer transport layer of the tunnel and executes the congestion control functionality at an inner transport layer of the tunnel based on the congestion conditions at the outer transport layer of the tunnel.

20 Claims, 5 Drawing Sheets

CONGESTION CONTROL FOR TUNNELED REAL-TIME COMMUNICATIONS

FIELD

One embodiment is directed generally to a communications network, and in particular, to delivering real-time traffic over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that performs congestion control functionality for real-time communications ("RTC"). The system establishes a tunnel by a tunneling server with a tunneling client of a user equipment ("UE"). The system receives a request from the UE to enable the congestion control functionality for an inner socket of the tunnel. The system sends a response back to the UE to indicate that the congestion control functionality is enabled for the inner socket. The system then monitors congestion conditions at an outer transport layer of the tunnel and executes the congestion control functionality at an inner transport layer of the tunnel based on the congestion conditions at the outer transport layer of the tunnel.

DETAILED DESCRIPTION

One embodiment provides congestion control services for real-time communications ("RTC") in a tunneling environment. In one embodiment, based on congestion information at the outer layer of a tunnel, a tunneling client throttles RTC traffic at the inner layer of the tunnel, causing the throughput of encapsulated media being temporarily and intentionally reduced in order to accelerate recovery from congestion and improve the overall RTC quality. Accordingly, in case of congestion, embodiments provide RTC that is only affected by short periods of media choppiness, thus preventing long periods of dead air and/or dropped speech/video phone calls.

Figure 1:
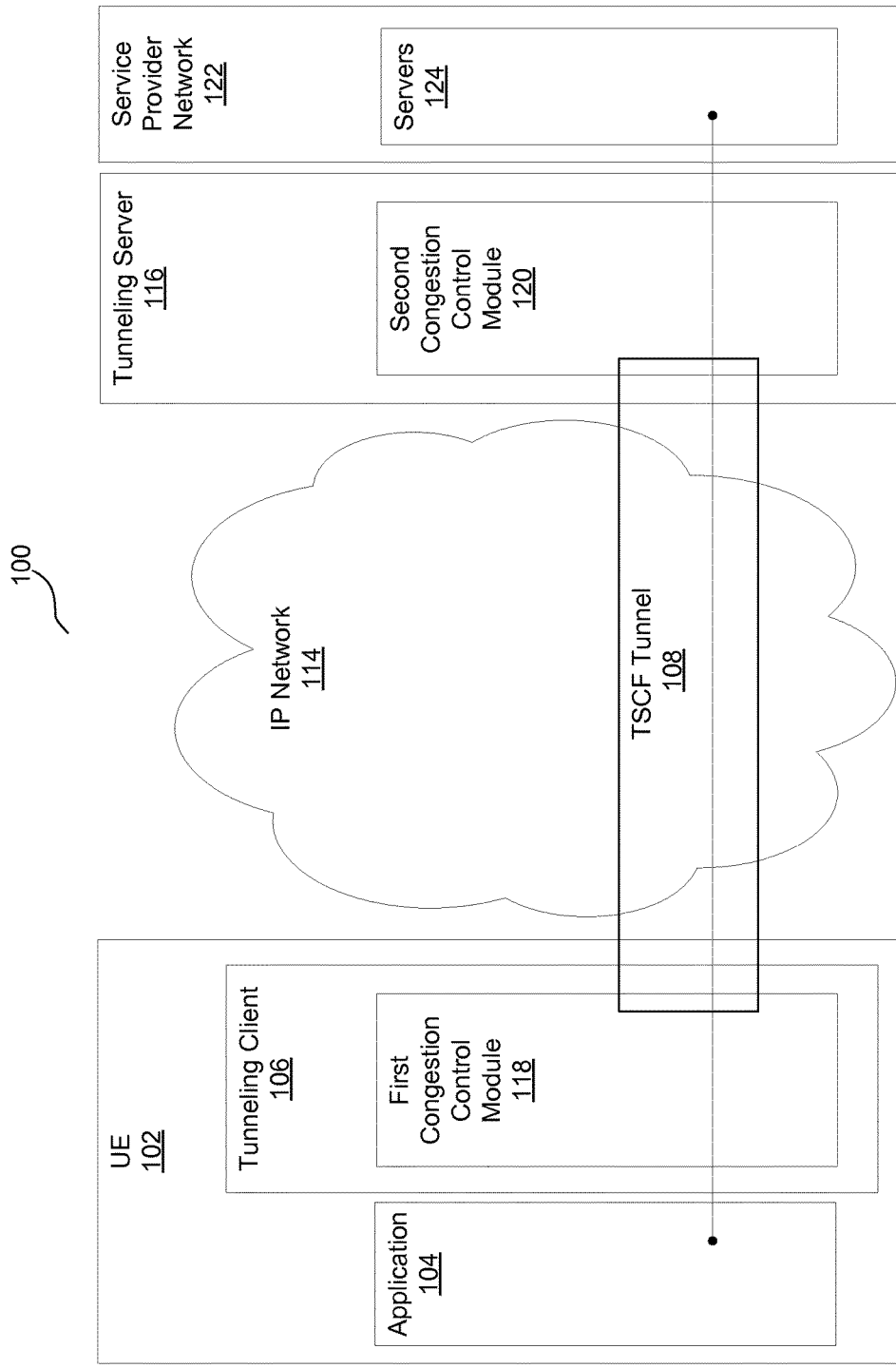
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs RTC over an Internet Protocol ("IP") network 114 with a service provider network 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the tunneled session management solution from Oracle Corp.

Figure 2:
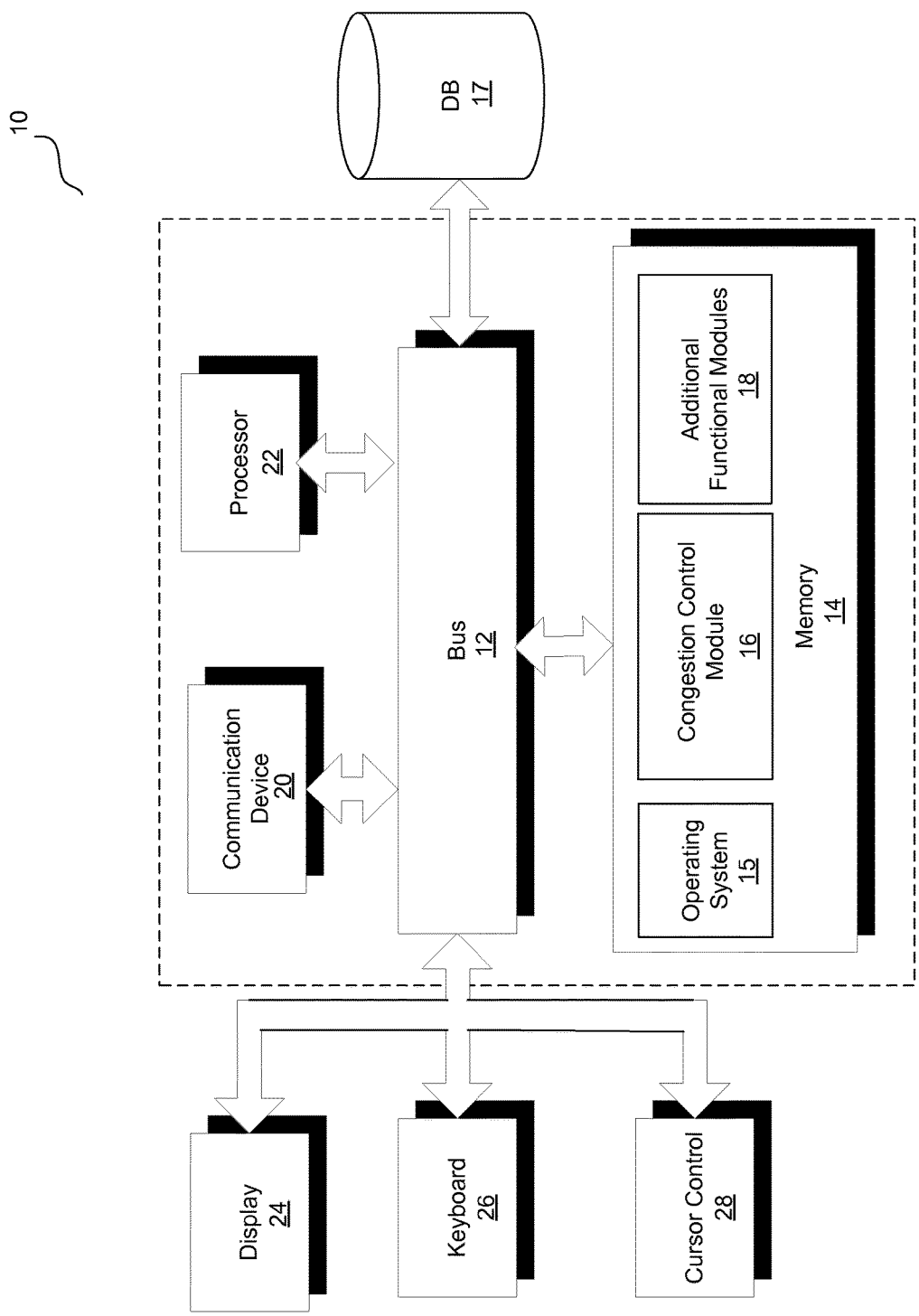
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a congestion control module 16 for providing congestion control, and all other functionality disclosed herein. In one example embodiment, congestion control module 16 may implement tunneling server 116 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for congestion control module 16 and additional functional modules 18.

In one embodiment, congestion control module 16 and/or additional functional modules 18 may include several modules to provide congestion control functionality, as will be described herein with reference to FIG. 5. The modules in one embodiment include a tunneling module that establishes a tunnel with a tunneling client of a user equipment and a monitoring module that monitors congestion conditions at an outer transport layer of the tunnel and executes the congestion control functionality at an inner transport layer of the tunnel.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated media is typically communicated according to the real-time transport protocol ("RTP" as provided, for example, in IETF RFC 3550).

Figure 3:
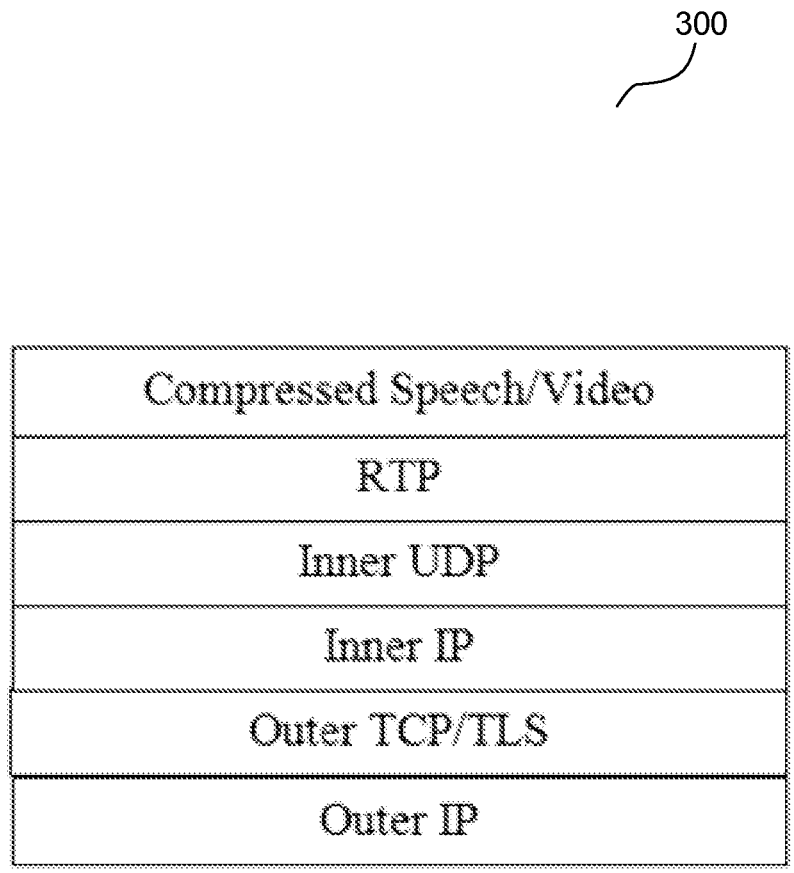
FIG. 3 shows example protocol layers in a tunneling configuration in accordance with an embodiment of the present invention.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 provides example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

One disadvantage with these known systems is that using a stream-based transport (e.g., TCP/TLS) generally requires the implementation of congestion control functionality so that a reliable transport is provided while regulating throughput. However, the known systems do not provide a tunneling configuration with congestion control functionality that works across both the inner transport layer and the outer transport layer. Therefore, if the outer layers experience congestion, the inner layers are not aware of that congestion, and hence do not react accordingly. Instead, with known systems, the inner layers typically worsen the congestion of the outer layers by flooding the lower layers with packets. That is, when congestion (and consequently latency) is experienced at the outer layers of a tunnel, it is further aggravated by the continuous transmission of encapsulated media packets through the inner layers of the tunnel.

In contrast to the known systems, embodiments of the present invention provide congestion control functionality that is triggered based on the outer layers of a tunnel but is implemented at the inner layers of a tunnel. One embodiment performs early detection of congestion of RTC (e.g., speech, video, etc.) in the outer transport layer of TSCF tunnel 108, and before such congestion can seriously compromise the overall quality of RTC, the embodiment triggers congestion control functionality at the inner transport layer of TSCF tunnel 108.

One embodiment provides congestion control functionality by implementing a first congestion control module 118 at tunneling client 106 and a second congestion control module 120 at tunneling server 116. In one embodiment, first congestion control module 118 and second congestion control module 120 implement circuit breakers at the inner transport layer of TSCF tunnel 108 such that the inner transport layer reacts to congestion as it begins to affect the outer transport layer of TSCF tunnel 108.

A circuit breaker in one embodiment is a software mechanism that is used to control the flow of information in a data path in order to minimize congestion. Circuit breakers can be implemented as software modules in the transport layer of both tunneling client 106 and tunneling server 116. Based on traffic conditions, the circuit breakers can be activated to prevent all outgoing traffic from being transmitted. When the right traffic conditions are met and the circuit breakers get activated, all outgoing traffic affected inside the tunnel is dropped in one embodiment. The traffic is not buffered since it is typically media traffic that should not be subjected to latency.

In one embodiment, one or both of first congestion control module 118 and second congestion control module 120 inspect encapsulated traffic established by an inner socket in TSCF tunnel 108 to identify congestion and initiate congestion control functionality on demand by triggering corresponding circuit breakers at tunneling client 106 or tunneling server 116. A network socket is an endpoint of an inter-process communication flow across a computer network according to a communications protocol. A network socket may be a datagram socket (a connectionless network socket) or a stream socket (a connection-oriented and sequenced socket). In general, for regular communications, a user can create a datagram or stream socket that uses the network interface of the system in which the application runs. In a TSCF environment, however, sockets use a tunnel for transport instead of a network interface. To differentiate these sockets from regular sockets, they are referred to as "inner sockets" since they only exist inside a tunnel. That is, an inner socket only exists in association with a tunnel and socket traffic gets transported by the tunnel.

One embodiment provides TSCF SDKs that support an application programming interface ("API") by which application 104 can enable congestion control functionality for an inner socket. For example, application 104 may enable circuit breaker support at tunneling client 106 for an inner socket by executing a corresponding "tsc_setsockopt" API with a corresponding socket option when an inner socket is created.

In one embodiment, when an inner socket in TSCF tunnel 108 establishes traffic, first congestion control module 118 and/or second congestion control module 120 monitor a media discontinuity period (e.g., 5 seconds) and trigger circuit breakers at both tunneling client 106 and tunneling server 116 when the media discontinuity period is above a threshold.

In an alternative or additional embodiment, when an inner socket in TSCF tunnel 108 establishes traffic, first congestion control module 118 and/or second congestion control module 120 check the media sending rate and trigger circuit breakers at both tunneling client 106 and tunneling server 116 accordingly. For example, first congestion control module 118 and/or second congestion control module 120 trigger respective circuit breakers if the media sending rate exceeds an estimated TCP throughput by a pre-configured factor (e.g., a factor of 10) at both tunneling client 106 and tunneling server 116. The media sending rate corresponds to the number of tunneled bits per second. Both server 116 and client 106 independently keep track of the media sending rate as frames are encapsulated by measuring the number of bytes "B" in each frame transmitted over a period of time "T". The media sending rate equals B×8/T. For example, for encapsulated G.711 speech, the media sending rate would be 64,000 bps.

In one embodiment, once first congestion control module 118 triggers a circuit breaker for an inner socket, first congestion control module 118 stops propagating the inner socket traffic until the measurements that triggered the circuit breaker (e.g., media discontinuity per unit of time and/or media sending rate) revert. That is, first congestion control module 118 stops propagating inner socket traffic until the media discontinuity per unit of time is below a corresponding threshold for the inner socket and the media sending rate does not exceed a corresponding estimated TCP throughput by a pre-configured factor for the inner socket.

Similarly, in one embodiment, once second congestion control module 120 triggers a circuit breaker for an inner socket, it stops propagating the inner socket traffic until the triggering measurements of media discontinuity per unit of time and/or media sending rate revert. That is, second congestion control module 120 stops propagating inner socket traffic until the media discontinuity per unit of time is below a corresponding threshold for the inner socket and the media sending rate does not exceed a corresponding estimated TCP throughput by a pre-configured factor for the inner socket.

In one embodiment, without application 104 being aware of any congestion control functionality, first congestion control module 118 transparently triggers circuit breakers whenever congestion is detected in encapsulated traffic in TSCF tunnel 108. In an alternative or additional embodiment, first congestion control module 118 notifies application 104 whenever congestion is detected and/or congestion control functionality is enabled for encapsulated traffic in TSCF tunnel 108. In one embodiment, when first congestion control module 118 detects congestion, it notifies application 104 by indicating the inner socket affected by such congestion.

One embodiment provides TSCF SDKs that support API notification for first congestion control module 118 to notify application 104 of triggering congestion control functionality in TSCF tunnel 108. In one embodiment, when a circuit breaker is triggered, first congestion control module 118 notifies application 104 by executing a "tsc_notification_enable" API.

Figure 4:
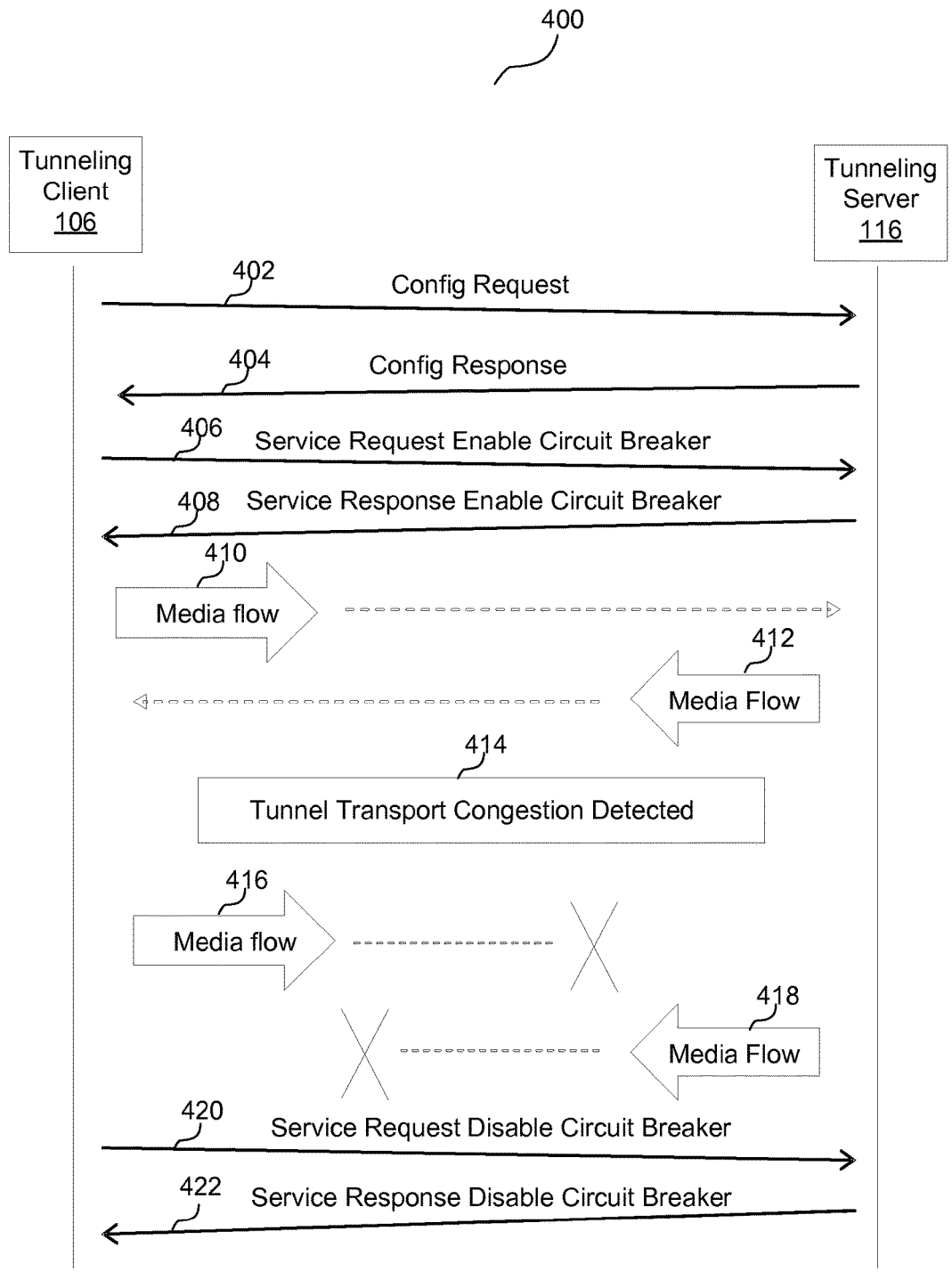
FIG. 4 is a message sequence diagram in accordance with embodiments of the present invention.

FIG. 4 is an example message sequence diagram 400 including the sequence of messages exchanged between tunneling client 106 and tunneling server 116 for enabling/disabling circuit breakers at tunneling client 106 and tunneling server 116, according to some embodiments. FIG. 4 includes network elements such as tunneling client 106 and tunneling server 116, as described herein with reference to FIG. 1.

At 402 tunneling client 106 sends a configuration request message to tunneling server 116 to establish TSCF tunnel 108, and at 404 tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the RTC application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 406 application 104 enables circuit breaker functionality for an inner socket in TSCF tunnel 108 by executing a "tsc_setsockopt" API on the inner socket. The execution of a "tsc_setsockopt" API causes first congestion control module 118 to send a TSCF service request message to tunneling server 116 to enable congestion control functionality for the inner socket at tunneling server 116.

At 408 second congestion control module 120 at tunneling server 116 receives this service request message, determines if tunneling server 116 can comply with the request, and answers back to first congestion control module 118 with a TSCF service response message to confirm that circuit breaker functionality is enabled. Server 116 may not be able to comply if it does not support the functionality because it runs an older version of the software or the functionality has not been configured as described below. Subsequently, both first congestion control module 118 and second congestion control module 120 start checking for tunnel transport conditions that would trigger circuit breakers. In one embodiment, first congestion control module 118 and second congestion control module 120 trigger circuit breakers based on the media discontinuity, media sending rate, etc., as described herein with reference to FIG. 1.

At 410 and 412 tunneling client 106 and tunneling server 116 use TSCF tunnel 108 to communicate media.

At 414 first congestion control module 118 and/or second congestion control module 120 detect congestion of an inner socket in TSCF tunnel 108 based on tunnel transport conditions that would trigger circuit breakers (e.g., based on media discontinuity per unit of time, media sending rate, etc., as described herein with reference to FIG. 1).

Subsequently, at 416 and 418 first congestion control module 118 and/or second congestion control module 120 activate respective circuit breakers and stop sending media traffic over the inner socket while those conditions are met, and subsequently restart sending media traffic once the conditions are reverted.

At 420, if application 104 issues a "tsc_setsockopt" to disable circuit breakers, first congestion control module 118 issues a TSCF service request message to tunneling server 116 to disable circuit breaker functionality, and at 422 second congestion control module 120 responds back to first congestion control module 118 with a corresponding TSCF service response message indicating that circuit breaker functionality has been disabled.

One embodiment supports congestion control functionality by providing a TSCF client service request message of type "Service_Type" with two TLV values indicating enablement and disablement of circuit breakers, respectively. Further, a "Connection_Info" TLV is provided to indicate source and destination transport and network endpoints. These service request types allow for tunneling client 106 to enable circuit breaker support at tunneling server 116. Table 1 below provides example TSCF TLVs for providing congestion control services, according to some embodiments.

TABLE 1

| TLV TYPE NAME | VALUE | SEMANTICS | SHORT/LONG FORMAT | VALUE TYPE | LENGTH | NOTES |
|---|---|---|---|---|---|---|
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable_Circuit_Breaker = 15 Disable_Circuit_Breaker = 16 |

Example TSCF TLVs for Providing Congestion Control Services

In one embodiment, circuit breaker functionality is requested by application 104 by executing a "tsc_socket" API and setting a corresponding socket option as provided in the following example functionality:

```
int circuit_breaker = 1;
int result = tsc_setsockopt(rtp_socket, SOL_SOCKET,
SO_TSC_CIRCUIT_BREAKER,
            (char *)&circuit_breaker, sizeof(int));
```

In the above functionality, the "circuit_breaker" integer indicates whether circuit breaker functionality is enabled (e.g., circuit_breaker=1) or disabled (e.g., circuit_breaker=0). If "tsc_setsockopt" returns "−1," the option has not been set correctly. If it returns "0," the option has been set correctly but circuit breakers are not officially enabled until they are negotiated.

In one embodiment, first congestion control module 118 uses a "tsc_notification_circuit_breaker" notification to notify application 104 about enablement of circuit breakers. The following is an example functionality for enabling such notification and for providing a corresponding callback:

```
tsc_notification_enable(handle, tsc_notification_circuit_breaker,
circuit_breaker_notification, NULL);
    void circuit_breaker_notification(tsc_notification_data *notification)
    {
       tsc_notification_circuit_breaker_info_data *circuit_breaker_data =
(tsc_notification_circuit_breaker_ info_data *)notification->data;
       if (circuit_breaker_data && circuit_breaker_data->
available == tsc_bool_true) {
          if (circuit_breaker_data->enabled == tsc_bool_true) {
             printf("circuit breaker enabled notification on socket %d\n",
playback_buffer_data->socket);
          } else {
             printf("circuit breaker notification playing on socket %d\n",
playback_buffer_data->socket);
          }
       } else {
          printf("circuit breaker notification not allowed on socket %d\n",
playback_buffer_data->socket);
       }
    }
```

In the above functionality, the fourth "NULL" parameter in "tsc_notification_enable" is an opaque/private data pointer that can be recovered in the "tsc_notification_data" structure upon callback.

One embodiment provides a configuration object "tscf-interface" that includes a parameter "assigned-services" with a keyword "CB" to enable circuit breakers. Table 2 below provides an example of such TSCF configuration object for providing congestion control services, according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: Blank | "CB" to enable circuit breakers | Optional |

An Example TSCF Configuration Object for Providing Congestion Control Services

The following functionality provides an example interface configuration for providing congestion control services, according to one embodiment:

```
tscf-interface
    realm-id                access
    state                   enabled
    max-tunnels             100
    local-address-pools     Ip-1
    assigned-services       SIP, CB
    tscf-port
        address             192.168.27.113
        port                4567
        transport-protocol TCP
        tls-profile
        rekey-profile
```

The following is an example extensible markup language ("XML") functionality for providing congestion control services, according to one embodiment:

```
<tscfInterface realmID='access'
    state='enabled'
    maxTunnels='100'
    assignedServices='SIP,CB'
    options=''
    objectId='33'>
    <key>access</key>
    <localAddressPool name='Ip-1'/>
    <tscfPort address='192.168.27.113'
    port='4567'
    transProtocol='TCP'
    tlsProfile=''
    rekeyProfile=''
</tscfInterface>
```

In one embodiment, once circuit breaker functionality is enabled, the following two conditions are evaluated periodically at first congestion control module 118 and second congestion control module 120 to determine whether circuit breakers are to be triggered (e.g., enabled) or restored (e.g., disabled):

If media traffic is not received during a certain time interval (e.g., typically a few seconds), the circuit breaker for the corresponding inner socket is triggered.

Alternatively or additionally, circuit breakers may be triggered by using TSCF loopback packets (used to measure QoS) to periodically calculate round trip time ("RTT") and packet loss or loss rate during a certain time interval (e.g., typically a few seconds). If the media sending rate exceeds the estimated TCP throughput by a certain factor (e.g., by a factor of 10). Loopback packets are TSCF tunneling framework packets or probes that are used to measure network impairments. They are sent by one end of the network and looped back at the other end. They have sequence number and timestamp information that allows both ends to keep track of them. A round-time trip is defined as the time a loopback packet takes to go and return to the endpoint of an original sender after being transmitted, and is measured in units of time (e.g., seconds). "Packet loss" is the probability of a loopback packet. The probability is a unit-less number between 0 (0%) and 1 (100%).

The two aforementioned conditions typically occur before the tunnel transport layer experiences congestion. Therefore, these conditions may be used to significantly reduce the effects of congestion since these conditions can provide early detection of congestion. In one embodiment, an estimated TCP throughput, T may be calculated as follows:

$$T = \frac{s}{R\sqrt{2p/3}} \quad (1)$$

where s is the average packet size, R is the RTT, value and p is the loss rate over the interval of interest (e.g., typically a few seconds).

Figure 5:
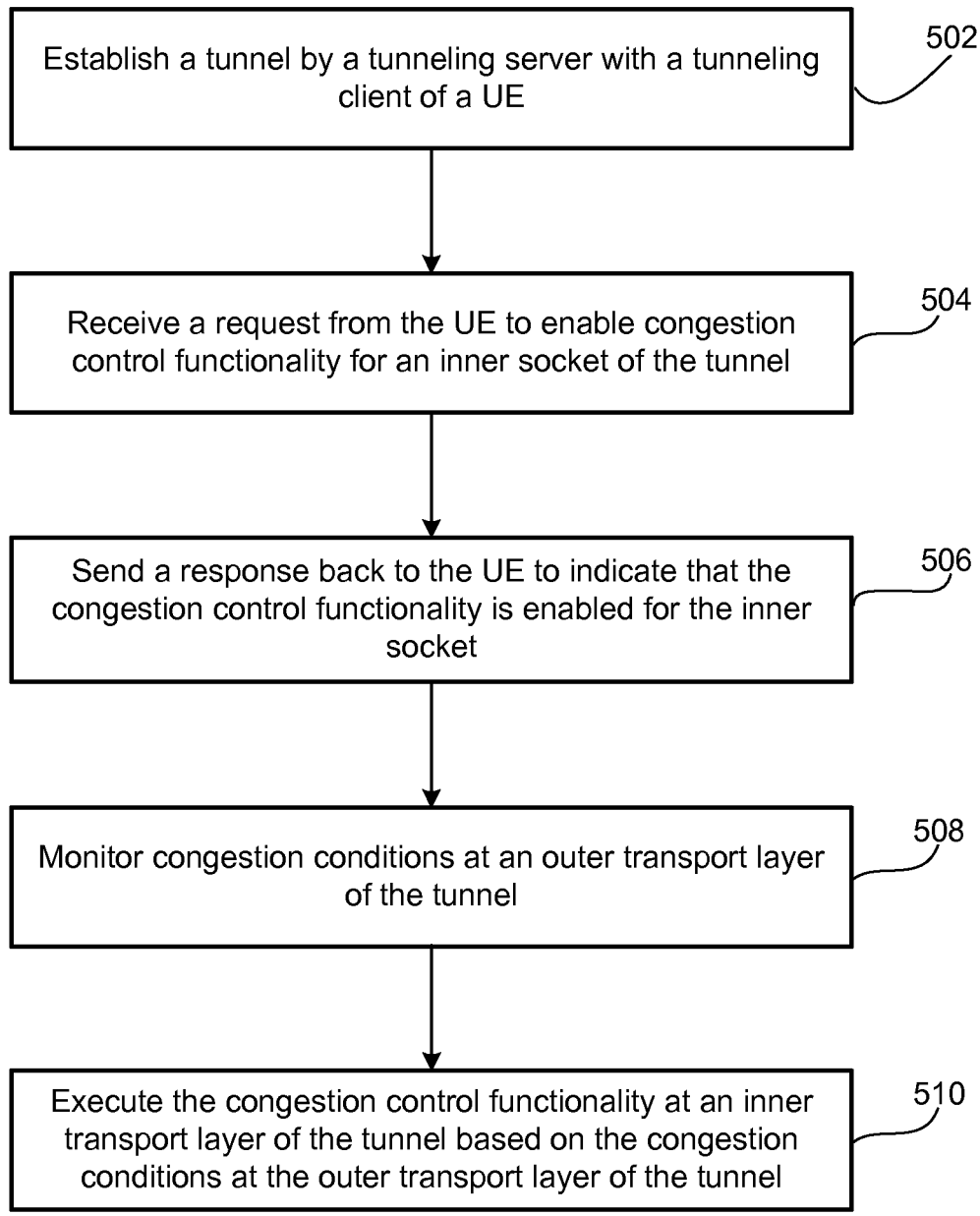
FIG. 5 is a flow diagram of the operation of the congestion control module of FIG. 2 when managing congestion in accordance with embodiments of the present invention.

FIG. 5 is a flow diagram of congestion control module 16 of FIG. 2 and/or tunneling server 116 of FIG. 1 when performing congestion control in accordance with embodiments of the present invention. In one embodiment, the functionality of the flow diagram of FIG. 5 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 502 tunneling client 106 and tunneling server 116 establish TSCF tunnel 108.

At 504 first congestion control module 118 at tunneling client 106 sends a TSCF service request to tunneling server 116 to enable congestion control functionality for an inner socket in TSCF tunnel 108. In one embodiment, first congestion control module 118 sends the request when application 104 executes an API to enable the congestion control functionality for the inner socket.

At 506 second congestion control module 120 at tunneling server 116 sends a TSCF service response back to first congestion control module 118 to indicate that congestion control functionality is enabled for the inner socket.

At 508 first congestion control module 118 and second congestion control module 120 monitor congestion conditions at an outer transport layer of TSCF tunnel 108 for the inner socket. In one embodiment, the congestion conditions of the inner socket are based on a media discontinuity per unit of time and a media sending rate.

At 510 first congestion control module 118 and second congestion control module 120 execute the congestion control functionality at an inner transport layer of TSCF tunnel 108 based on the congestion conditions at the outer transport layer of TSCF tunnel 108.

In one embodiment, the congestion control functionality implements circuit breakers at tunneling client 106 and tunneling server 116. Accordingly, when the congestion conditions indicate congestion of the inner socket at the outer transport layer of TSCF tunnel 108, the congestion control functionality activates the circuit breakers to halt communications of the inner socket at the inner transport layer of TSCF tunnel 108. Further, when the congestion conditions indicate no congestion of the inner socket at the outer transport layer of TSCF tunnel 108, the congestion control functionality deactivates the circuit breakers to resume the communications of the inner socket at the inner transport layer of TSCF tunnel 108.

In one embodiment, upon determining congestion of the inner socket at the outer transport layer of TSCF tunnel 108, first congestion control module 118 provides a corresponding notification to application 104 indicating the inner socket that is affected by congestion.

In one embodiment, first congestion control module 118 sends a subsequent request to second congestion control module 120 to disable the congestion control functionality, and second congestion control module 120 sends a TSCF service response back to first congestion control module 118 to indicate that congestion control functionality is disabled.

As disclosed, embodiments allow for a TSCF tunneling configuration that provides congestion control functionality for encapsulated media. Embodiments provide throughput throttling via circuit breakers at an inner tunnel transport layer whenever the tunneling framework starts detecting the first signs of congestion at an outer transport layer. By reducing the inner transmission rate, congestion is alleviated and recovery occurs at a much faster rate. Moreover, embodiments embed the congestion control functionality well into the tunneling configuration such that this functionality is made transparent to an RTC application. Accordingly, embodiments give the end user the possibility of improving the overall RTC quality by expediting recovery from congestion.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to perform congestion control functionality for real-time communications (RTC), the congestion control functionality comprising:

establishing a tunnel by a tunneling server with a tunneling client of a user equipment (UE);

receiving a request from the UE to enable the congestion control functionality for an inner socket of the tunnel;

sending a response back to the UE to indicate that the congestion control functionality is enabled for the inner socket;

monitoring congestion conditions at an outer transport layer of the tunnel; and
executing the congestion control functionality at an inner transport layer of the tunnel based on the congestion conditions at the outer transport layer of the tunnel.

2. The computer readable medium of claim 1,
wherein the tunnel is configured according to a tunneled services control function (TSCF) standard;
wherein the request is a TSCF service request message; and
wherein the response is a TSCF service response message.

3. The computer readable medium of claim 1,
wherein the congestion control functionality implements circuit breakers at the tunneling client and at the tunneling server;
wherein, when the congestion conditions indicate congestion of the inner socket at the outer transport layer of the tunnel, the congestion control functionality activates the circuit breakers to halt communications of the inner socket at the inner transport layer of the tunnel; and
wherein, when the congestion conditions indicate no congestion of the inner socket at the outer transport layer of the tunnel, the congestion control functionality deactivates the circuit breakers to resume communications of the inner socket at the inner transport layer of the tunnel.

4. The computer readable medium of claim 1,
wherein, upon determining congestion of the inner socket at the outer transport layer of the tunnel, the tunneling client provides a corresponding notification to an RTC application at the UE; and
wherein the notification indicates the inner socket that is affected by congestion.

5. The computer readable medium of claim 1,
wherein the monitoring congestion conditions at the outer transport layer of the tunnel comprises sending loopback packets across the tunnel.

6. The computer readable medium of claim 1,
wherein congestion conditions of the inner socket are based on a media discontinuity period and a media sending rate.

7. The computer readable medium of claim 1,
wherein the monitoring congestion conditions at the outer transport layer of the tunnel comprises determining a throughput T using:

$$T = \frac{s}{R\sqrt{2p/3}}$$

where s is an average packet size, R is an RTT value and p is a loss rate over an interval of interest.

8. A method of performing congestion control functionality for real-time communications (RTC), the method comprising:
establishing a tunnel by a tunneling server with a tunneling client of a user equipment (UE);
receiving a request from the UE to enable the congestion control functionality for an inner socket of the tunnel;
sending a response back to the UE to indicate that the congestion control functionality is enabled for the inner socket;
monitoring congestion conditions at an outer transport layer of the tunnel; and
executing the congestion control functionality at an inner transport layer of the tunnel based on the congestion conditions at the outer transport layer of the tunnel.

9. The method of claim 8,
wherein the tunnel is configured according to a tunneled services control function (TSCF) standard;
wherein the request is a TSCF service request message; and
wherein the response is a TSCF service response message.

10. The method of claim 8,
wherein the congestion control functionality implements circuit breakers at the tunneling client and at the tunneling server;
wherein, when the congestion conditions indicate congestion of the inner socket at the outer transport layer of the tunnel, the congestion control functionality activates the circuit breakers to halt communications of the inner socket at the inner transport layer of the tunnel; and
wherein, when the congestion conditions indicate no congestion of the inner socket at the outer transport layer of the tunnel, the congestion control functionality deactivates the circuit breakers to resume communications of the inner socket at the inner transport layer of the tunnel.

11. The method of claim 8,
wherein, upon determining congestion of the inner socket at the outer transport layer of the tunnel, the tunneling client provides a corresponding notification to an RTC application at the UE; and
wherein the notification indicates the inner socket that is affected by congestion.

12. The method of claim 8,
wherein the monitoring congestion conditions at the outer transport layer of the tunnel comprises sending loopback packets across the tunnel.

13. The method of claim 8,
wherein congestion conditions of the inner socket are based on a media discontinuity period and a media sending rate.

14. The method of claim 8,
wherein the monitoring congestion conditions at the outer transport layer of the tunnel comprises determining a throughput T using:

$$T = \frac{s}{R\sqrt{2p/3}}$$

where s is an average packet size, R is an RTT value and p is a loss rate over an interval of interest.

15. A tunneling server comprising:
a processor;
a storage device coupled to the processor that stores a congestion control module, the congestion control module, when executed by the processor, implementing modules comprising:
a tunneling module that establishes a tunnel with a tunneling client of a user equipment (UE) and, in response to receiving a request from the UE to enable a congestion control functionality for an inner socket of the tunnel, sends a response back to the UE to indicate that the congestion control functionality is enabled for the inner socket; and
a monitoring module that monitors congestion conditions at an outer transport layer of the tunnel and executes the congestion control functionality at an inner transport layer of the tunnel based on the congestion conditions at the outer transport layer of the tunnel.

16. The tunneling server of claim 15,
wherein, upon determining congestion of the inner socket at the outer transport layer of the tunnel, the tunneling client provides a corresponding notification to an RTC application at the UE; and
wherein the notification indicates the inner socket that is affected by congestion.

17. The tunneling server of claim 15,
wherein the monitoring congestion conditions at the outer transport layer of the tunnel comprises sending loop-back packets across the tunnel.

18. The tunneling server of claim 15,
wherein congestion conditions of the inner socket are based on a media discontinuity period and a media sending rate.

19. The tunneling server of claim 15,
wherein the monitoring congestion conditions at the outer transport layer of the tunnel comprises determining a throughput T using:

$$T = \frac{s}{R\sqrt{2p/3}}$$

where s is an average packet size, R is an RTT value and p is a loss rate over an interval of interest.

20. The tunneling server of claim 15,
wherein the tunnel is configured according to a tunneled services control function (TSCF) standard;
wherein the request is a TSCF service request message; and
wherein the response is a TSCF service response message.

\* \* \* \* \*